United States Patent [19]
Alessio

[11] Patent Number: 4,561,674
[45] Date of Patent: Dec. 31, 1985

[54] MULTIPURPOSE HAND TRUCK WITH MOVABLE WHEELS

[75] Inventor: Lorenzo E. Alessio, Lecco, Italy

[73] Assignee: Black & Decker Inc., Newark, Del.

[21] Appl. No.: 613,165

[22] Filed: May 23, 1984

[30] Foreign Application Priority Data

May 26, 1983 [IT] Italy ............................... 21973/83[U]

[51] Int. Cl.[4] .............................................. B62B 1/04
[52] U.S. Cl. ................................ 280/655; 280/47.21; 280/47.29
[58] Field of Search ...................... 280/30, 43.1, 47.18, 280/47.21, 47.28, 47.29, 47.30, 47.31, 47.32, 47.33, 47.37, 47.27, 47.24, 651, 652, 653, 655, 659; 403/65

[56] References Cited

U.S. PATENT DOCUMENTS

| | | | |
|---|---|---|---|
| 308,362 | 11/1884 | Hughes | 280/659 |
| 423,227 | 3/1890 | Eckstrom | 280/47.21 |
| 4,092,032 | 5/1978 | Pittas | 280/30 |
| 4,185,853 | 1/1980 | Thurmond, Jr. | 280/47.28 |

FOREIGN PATENT DOCUMENTS

| | | | |
|---|---|---|---|
| 17001/76 | 2/1978 | Australia . | |
| 2651592 | 1/1980 | Fed. Rep. of Germany . | |
| 608651 | 9/1948 | United Kingdom | 280/47.27 |
| 611201 | 10/1948 | United Kingdom . | |
| 622060 | 4/1949 | United Kingdom . | |
| 632745 | 12/1949 | United Kingdom . | |
| 667386 | 2/1952 | United Kingdom . | |
| 678108 | 8/1952 | United Kingdom . | |
| 723732 | 2/1955 | United Kingdom . | |
| 1441465 | 6/1976 | United Kingdom . | |
| 1495475 | 12/1977 | United Kingdom . | |

OTHER PUBLICATIONS

J. C. Whitney & Co.; Automotive Parts and Accessories; Catalog No. 427B; 1982, p. 10.

Primary Examiner—David M. Mitchell
Assistant Examiner—Richard M. Camby
Attorney, Agent, or Firm—Ronald B. Sherer; Edward D. Murphy; Harold Weinstein

[57] ABSTRACT

A multipurpose hand truck has a base frame with a handle frame connected thereto and orientatable to different angular positions relative to the base frame. A pair of wheels, which support the base frame, are mounted for movement in location along the base frame and are releasably securable thereto in at least two alternative spaced apart locations. Preferably wheel support brackets have channel sections therein which are slidable lengthwise along side members of the base frame. Pivotal plates connecting the handle and base frames enable the handle frame to be stored in overlying relation to and spaced above the base frame. A front load retaining plate is invertible to form a rest support.

12 Claims, 6 Drawing Figures

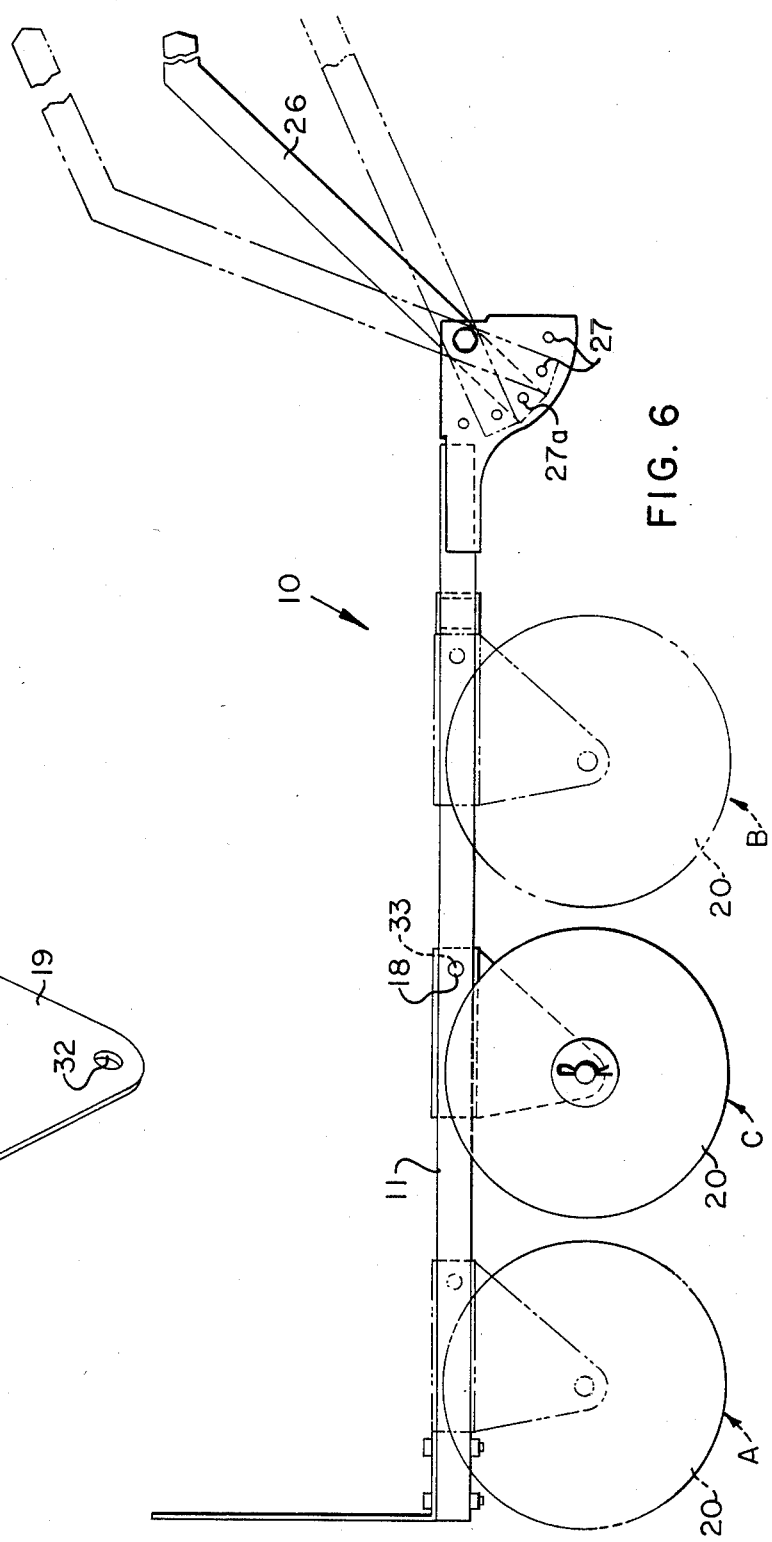

MULTIPURPOSE HAND TRUCK WITH MOVABLE WHEELS

FIELD OF THE INVENTION

This invention relates to hand trucks, and in particular to multipurpose hand trucks capable of being adjusted to different configurations to accommodate different types of load and different functions.

BACKGROUND OF THE INVENTION

Trucks are known which have a loading structure of variable configuration in accordance with the type of transportation to be effected and with the bulk of the material to be transported.

These trucks generally have one or more pairs of wheels the position of which is fixed relative to the main structure of the trucks. Parts of the frame can be variously oriented, joined together or telescopically retracted into the base frame to make it possible to achieve the various operative configurations of the truck.

Hand trucks in which some of the wheels are movable relative to the base frame structure by pivoting action have been proposed, see for example Australian patent specification No. 17001/76 and German Pat. No. 25 51 592.

The above trucks, although very practical in use, have the not negligible disadvantage of relatively high cost of manufacture and, therefore, relatively high selling prices, while in some cases there are also problems of weight and transportation.

SUMMARY OF THE INVENTION

An object of the present invention is to provide a multipurpose truck which combines the virtues of easy handling and practicality with moderate weight and bulk, together with modest cost of production.

A feature by which this object is achieved is by mounting a pair of support wheels on brackets which are shiftable in location along the base of the truck. This has the advantage that the load bearing position of the wheels can be changed for different types of loads and use.

Another feature of the invention is a pair of plates by which a handle frame structure is attached to the base of the truck, the plates being pivotal relative to the truck base and the handle structure being pivotal relative to the plates, both such pivotal motions being about spaced apart parallel axes. This provides the advantage that the handle structure can occupy different orientations relative to the truck base for different loads and different locations of the support wheels, and also enables a compact folded configuration of the truck to be obtained.

Yet another feature of the invention is a reversible end plate which in one orientation functions as a load retaining member and in the other orientation functions as a support on which the front of the truck can rest. This has the advantage of enabling the truck to be adapted for more different purposes, particularly in combination with the shiftable wheels and adjustable handle structure. Also, it facilitates a more compact folded configuration of the truck for storage or transportation.

There is provided, therefore, according to the present invention a multipurpose hand truck comprising a base frame defining a lengthwise direction. A handle frame is connected to the base frame and orientatable to different positions relative to the base frame. A pair of wheels have means for mounting the pair of wheels on the base frame to support the latter, this mounting means being movable in location along the base frame and being releasably securable thereto in at least two alternative locations spaced apart in said lengthwise direction.

The mounting means may comprise two brackets which are movable along side members of the base frame. Preferably these brackets each include a channel portion in which a respective side member slidably engages.

Preferably a pair of plates are connected to the base frame on opposite sides thereof and pivotal about a first axis, the handle frame also being connected to these plates and pivotal relative thereto about a second axis parallel to and spaced apart from the first axis. First securing means may releasably secure the plates against pivoting relative to the base frame, and second securing means may releasably secure the handle frame to the plates in different angular orientations relative to the plates.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 5 is a perspective view of a wheel mounting bracket of the truck of FIGS. 1 to 4; and FIG. 6 is a side elevational view similar to FIG. 2 but in another configuration of the truck and illustrating further configurations in broken lines.

DETAILED DESCRIPTION OF THE PREFERRED EMBODIMENT

Figure 1:
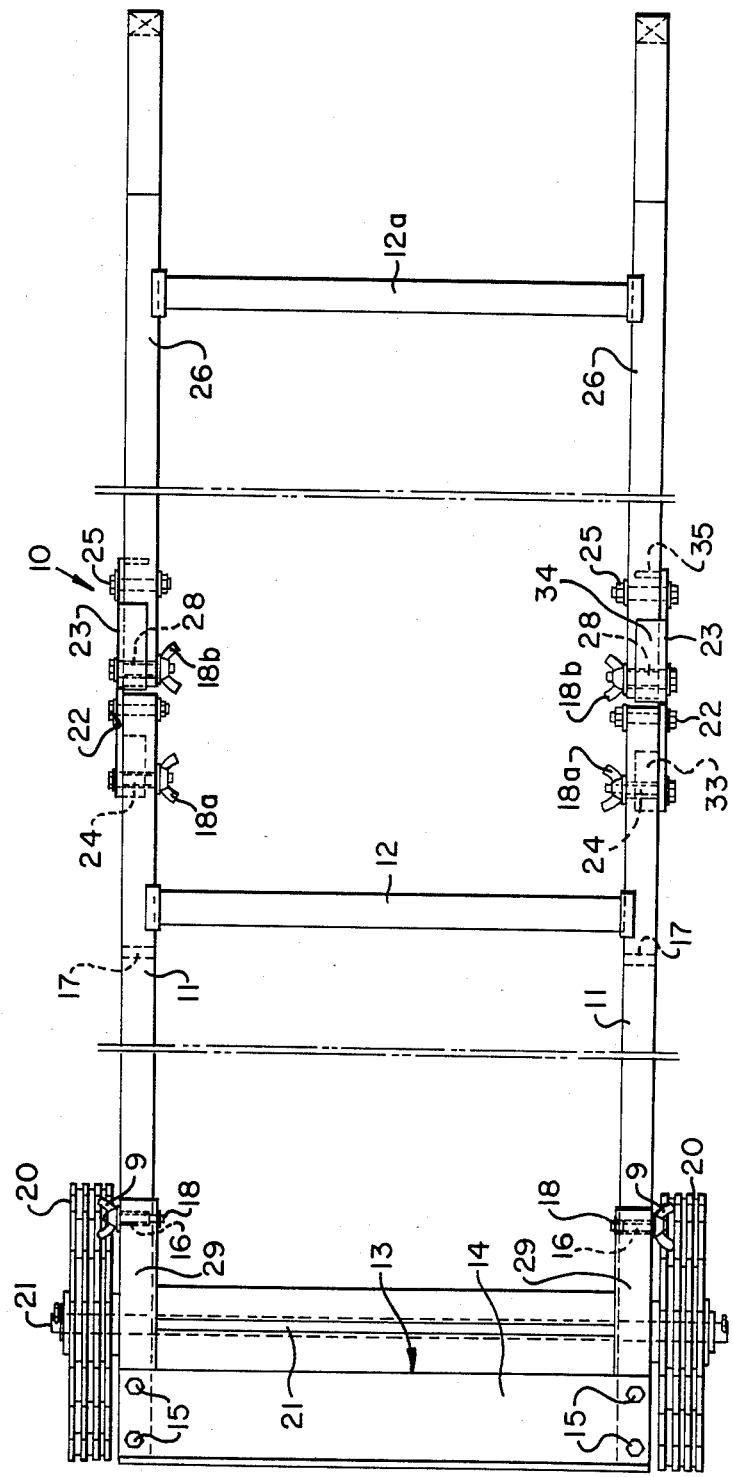
FIG. 1 is a top plan view of a truck constructed in accordance with the invention, with the wheels positioned adjacent one end of the base frame and the handle frame in alignment with the base frame.

Referring to the drawings, a universal multipurpose truck constructed in accordance with the invention, and designated by the general reference 10, comprises a pair of sectional longitudinal side members 11, for example tubular members, joined by at least one crossbar 12 and at the front end carrying an end member 13. The end member 13 comprises a plate having a base flange 14 at right angles thereto and releasably secured by threaded bolts 15 to the longitudinal members 11. At least two holes 16 and 17 are formed transversely in each of the longitudinal members 11 at spaced apart locations along the length thereof and are capable of receiving threaded bolts 18 having wing nuts 9 for fastening an axle assembly comprising two V-shaped plates 19 carrying wheels 20 mounted on an axle 21. The top edges of the V-shaped plates 19 are welded to two C-section channel sections 29 slidable along the longitudinal members 11, and the apex of each V-shaped plate 19 is directed downwardly.

The longitudinal side members 11 and the transverse member or members 12 comprise the base frame of the truck. Each channel section 29 and attached V-shaped plate 19 comprises a movable bracket for mounting the wheel axle 21 which passes through each plate 19 with the respective wheel 20 located to the outside of that plate.

At the opposite end of the base frame to the end member 13, each longitudinal member 11 has articulated to it at 22, by means of rivets or bolts, a suitably profiled plate 23. In a portion extended towards the longitudinal members 11, each of the plates 23 releasably carries threaded bolts 18a with wing nuts capable of engaging in a respective hole 24 in each of the longitudinal members for locking each plate 23 in the position shown in FIGS. 2 and 3. In the part of each plate 23 which projects away from the longitudinal members 11, there are articulated at 25, by means of rivets or bolts, two tubular handle frame members 26 shaped at their free ends as handles and provided with one or more connecting crossbars 12a. A series of holes 27 through each plate 23 are formed in an arc around the articulation or pivotal point 25 and permit the angular adjustment of the inclination of the handle frame members 26. A hole 28 at the end of each member 26 is aligned with a selected one of the holes 27, and a bolt 18b with a wing nut secured through the aligned holes to releasably secure the handle frame in its selected orientation.

The multipurpose hand truck 10 thus described can occupy different configurations as will be described below.

Figure 2:
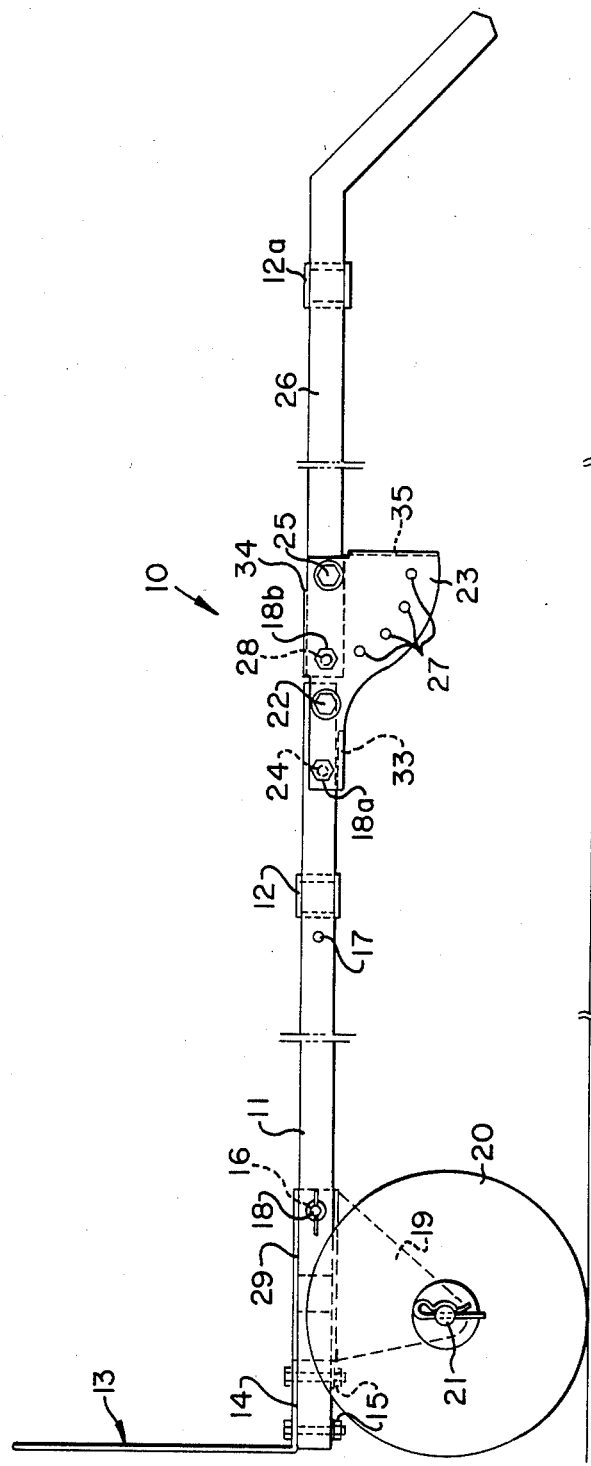
FIG. 2 is a side view in elevation of the truck shown in FIG. 1.

In FIGS. 1 and 2 the truck 10 is arranged by positioning the end member 13 upwards with the right angled base flange 14 secured on the base frame side members 11 by means of the bolts 15. The channel sections 29 are positioned on and fastened to base frame members 11 by means of the bolts 18 and associated wing nuts and thus hold the V-shaped plates 19 and the wheels 20 in a front position. The bolts 18a and associated wing nuts position and secure the forwardly extending part of the plate 23 outside and in alignment with the longitudinal members 11, with the bolts 18a passing through end holes in the plates 23 and the holes 24 in the members 11. The bolts 18b are positioned through the most forward holes 27 and through the handle frame holes 28 to hold the handle frame sections 26 perfectly in alignment with the base frame members 11. The truck 10 is thus configured with an upwardly extending end loading member 13 situated at the front end, and with an ample load support surface formed by the base frame members 11, 12 and the aligned handle frame 26, 12a. An arrangement of this kind is particularly suitable for transporting sacks, cases or other particularly large or rectangular objects.

The truck 10 can be given a different configuration by the simple adjustments which are described below.

Figure 3:
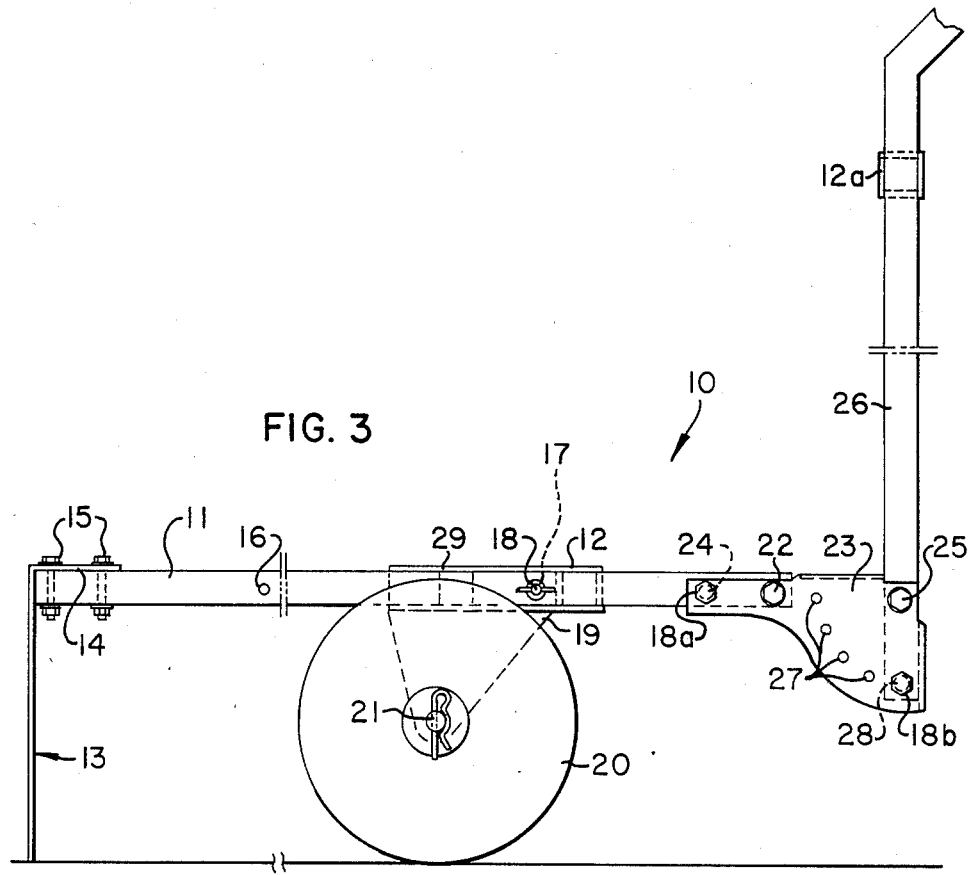
FIG. 3 is a side view in elevation of the truck shown in FIG. 1, with the wheels shifted and parts of the structure arranged differently.

To obtain the configuration of FIG. 3, the bolts 18 are removed, the channel sections 19 of the wheel assembly are slid rearwardly along the side members 11 until the holes in the channel sections 19 are in alignment with the holes 17, then the bolts 18 are resecured through the holes 17 and the holes in the channel sections 19. The bolts 15 are removed, the front plate 13 inverted, and then the flange of the inverted front plate resecured on top of the forward ends of the base frame members 11 by the same bolts 15. The bolts 18b are removed, the handle frame members 26 pivoted counter-clockwise through 90 degrees relative to the plates 23 about the articulation points or bolts 25, and then the bolts 18b are resecured through the lowermost holes 27 in the plates 23 and the holes 28 in the ends of the members 26. The length of the truck has been shortened, the wheels 20 are intermediate the length of the base frame but nearer the handle frame which is now upright, and the plate 13 now predominantly forms a front resting support for the truck.

In the configuration of FIG. 3, the truck 10 is particularly suitable for transporting articles in a stable vertical position and for moving such articles with minimum backward inclination of the handle frame members 26, the latter acting as a vertical rear end support. A smaller loading surface is formed by the base frame only, and the inverted front plate 13 supports the forward weight of the truck when the truck is parked with a slight forward inclination.

Figure 4:
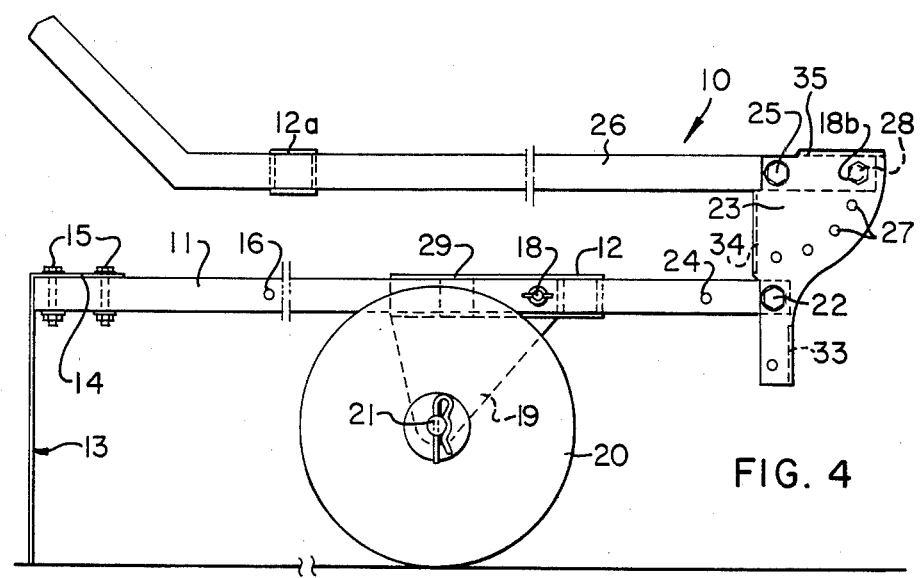
FIG. 4 is a side elevational view of the truck in the folded configuration for storage or transportation.

To obtain the configuration of FIG. 4, the bolts 18a are removed and the plates 23, with attached handle frame members 26, are pivoted counter-clockwise about the bolts 22 through 90 degrees from the position in FIG. 3. The handle frame members 26 are now orientated in overlying relationship to the base frame, with the members 26 substantially parallel to and spaced above the members 11. It will be noted that the handle frame is spaced above the base frame by an amount equal approximately to the distance between the two articulation points 22, 25, the pivotal axis of these articulation points being parallel.

In this folded configuration of FIG. 4, the truck occupies its minimum dimensions and is now suitable for storage or transporting, for example in the trunk of an automobile.

A transport configuration could also be imparted to the truck while generally arranged in the manner illustrated in FIGS. 1 and 2, provided the upwardly extending front end plate 13 is suitably shaped or has seats shaped therein to receive and accommodate the hand grip end portions of the handle frame members 26 when in the overlying fully folded position of FIG. 4.

FIG. 5 shows in perspective view one of the movable wheel support brackets having the channel section 29 open on the outwardly facing side, and the hole 30 therein for aligning with the holes 16 or 17 and engagement by the bolt 18. The welding 31 between the downwardly extending V-shaped plate 19 and the lower side of the channel section 29 can be seen. The lower apex of the V-shaped plate 19 is provided with a hole 32 through which the wheel axle 21 engages. The other wheel support bracket is similar.

It should be noted that each plate 23 has three inwardly directed flanges 33, 34 and 35, see FIGS. 1, 2 and 4. These three flanges are directed inwardly and act as limiting stops for the pivoting movement of the plate 23 and the respective handle frame member 26. The flanges 33 and 34 are parallel, and the flange 35 is in a plane perpendicular to the plane of the flange 34. The flange 33 limits the clockwise pivoting movement of the plate relative to the respective base frame member 11, see FIG. 1. The flange 34 limits the clockwise pivotal movement of the member 26 relative to the plate 23, see FIG. 1, and the flange 35 limits the counter-clockwise pivotal movement of the handle frame member 26 relative to the plate 23, see FIGS. 3 and 4. Further, the forward edge of the flange 34, as viewed in FIG. 1, engages the upper surface of the base frame member 11 to limit counter-clockwise pivotal movement of the plate 23 relative to the base frame member 11, see FIG. 4.

FIG. 6 illustrates further different orientations that are obtainable with the truck. The positions A and B of the wheels 20 shown in broken lines are those of FIGS. 1 and 3, respectively. The position C, shown in full lines, is intermediate the positions A and B and obtained by aligning the holes 30 in the wheel support brackets with an intermediate hole 33 in the base frame members 11, and securing through the aligned holes with the bolt 18. The handle frame is shown in full lines in a mid position with holes 28 in the end of the members 26 aligned with the middle one 27a of the arc of holes 27. Intermediate positions of the handle frame are shown on each side in broken lines and obtained by making use of other holes 27 in the arc.

It will be appreciated, therefore, that many different configurations are readily obtainable with this truck to suit the particular application to which it is to be put. All of these configurations are simply achieved by removing bolts, moving one or more components, and then resecuring with the bolts in the new position.

If one or more intermediate positions of the wheels 20 between the positions of FIGS. 2 and 3 are expected to be needed, then it may be desirable to have permanent or removable extensions extending downwardly from the plates 23, in their position in FIG. 6, to serve as legs or feet for resting on the ground.

The above described embodiments, of course, are not to be construed as limiting the breadth of the present invention. Modifications, and other alternative constructions, will be apparent which are within the spirit and scope of the invention as defined in the appended claims.

What is claimed is:

1. A multipurpose hand truck, comprising:
   a base frame defining a lengthwise direction;
   a handle frame connected to the base frame and orientatable to different positions relative to the base frame;
   a pair of wheels;
   means for mounting said pair of wheels on the base frame to support the latter;
   said mounting means being movable in location along the base frame and releasably securable thereto in at least two alternative locations spaced apart in said lengthwise direction;
   a pair of plates connected to said base frame on opposite sides thereof and pivotal about a first axis, said handle frame also being connected to said plates and pivotal relative thereto about a second axis parallel to and spaced apart from said first axis;
   first securing means for releasably securing said plates against pivoting relative to said base frame; and
   second securing means for releasably securing said handle frame to said plates in different angular orientations relative to said plates.

2. The truck of claim 1, further comprising means, associated with the base frame, for cooperating with said mounting means to determine said alternative locations.

3. The truck of claim 2, wherein said cooperating means comprises bolt holes in said base frame spaced apart along said lengthwise direction.

4. The truck of claim 1, wherein said base frame comprises two side members, and said mounting means comprises two brackets which are movable along said side members.

5. The truck of claim 4, wherein each of said brackets has a channel portion in which a respective one of said side members slidably engages, and a part depending downwardly from said channel portion, and further comprising an axle on which said pair of wheels are mounted, said axle being supported by the downwardly depending parts of said brackets.

6. The truck of claim 5, wherein each said channel portion has an aperture therein, and each said side member has at least two lengthwise spaced apart holes therein, and further comprising at least two bolts releasably engageable through said apertures and said holes to locate and secure said brackets in said alternative locations.

7. The truck of claim 1, wherein said first securing means comprises alignable holes in said plates and said base frame and securing members engageable through the holes when aligned.

8. The truck of claim 1, wherein each of said plates has a plurality of spaced apart holes therein alignable in turn with an aperture in said handle frame, and a securing member releasably engageable through any one of said holes aligned with said aperture to secure said handle frame in a selected orientation relative to said plates.

9. The truck of claim 1, wherein said plates can pivot through 90 degrees relative to said base frame to orientate said handle frame parallel to said base frame in a folded disposition of the truck, said handle frame in said folded disposition being spaced from and above said base frame by said plates.

10. The truck of claim 1, wherein said handle frame is attached to said base frame at one end thereof, and further comprising an end plate releasably attached to said base frame at the opposite end thereof, said end plate having a flange at right angles thereto, said flange having bolt holes therein through which bolts releasably secure said flange to said base frame, whereby said end plate can be directed in either of two opposite directions with respect to said base frame by securing either one or the opposite side of said flange against said base frame.

11. A multipurpose hand truck, comprising:
   a base frame having two side members defining a lengthwise direction;
   a handle structure connected to said base frame at one end thereof and orientatable to different positions relative to said base frame;
   a pair of wheels mounted on an axle;
   a pair of brackets which engage said side members and are movable therealong in said lengthwise direction;
   said axle being mounted through said brackets with said wheels disposed outside said brackets;
   means for releasably securing said brackets in at least two spaced apart alternative locations along said side member; and
   a pair of plates pivotally connected to said base frame and releasably securable in one position, said handle structure being pivotally connected to said plates and releasably securable thereto in any selected one of a plurality of positions.

12. A multipurpose hand truck, comprising:
   a base frame having two side members connected by at least one transverse member;
   an end plate releasably secured to one end of said base frame, said end plate being securable in either one of two orientations to form a load retaining plate in one such orientation and a support plate for supporting said base frame in the other of said orientations;

a pair of plates connected to said base frame at the other end thereof and pivotal relative to said base frame about a first axis;

first securing means for releasably securing said plates in one pivotal orientation relative to said base plate;

a handle frame by which the truck can be gripped and manipulated by an operator, said handle frame being pivotally connected to said plates and pivotal relative thereto about a second axis parallel to and spaced apart from said first axis;

second securing means for releasably securing said handle frame in different pivotal orientations relative to said plates;

a pair of brackets movable along said side members, each of said brackets having a channel portion in which a respective one of said side members engages and a V-shaped plate depending downwardly from said channel portion;

means for releasably securing said brackets in at least two spaced apart alternative locations along said side members; and a pair of wheels mounted on an axle, said axle being mounted in said V-shaped plates.

* * * * *